(12) United States Patent
Ayrapetian et al.

(10) Patent No.: US 11,815,525 B1
(45) Date of Patent: Nov. 14, 2023

(54) SYSTEM TO DETERMINE DEVICE DISPOSITION

(71) Applicant: AMAZON TECHNOLOGIES, INC., Seattle, WA (US)

(72) Inventors: Edward Ayrapetian, San Jose, CA (US); Animesh Mishra, Cambridge (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 261 days.

(21) Appl. No.: 17/020,093

(22) Filed: Sep. 14, 2020

(51) Int. Cl.
*G01P 15/18* (2013.01)
*G01P 13/00* (2006.01)
*H04R 29/00* (2006.01)

(52) U.S. Cl.
CPC .............. *G01P 15/18* (2013.01); *G01P 13/00* (2013.01); *H04R 29/00* (2013.01)

(58) Field of Classification Search
CPC .......... G01P 15/18; G01P 13/00; H04R 29/00
USPC ......................................................... 73/488
See application file for complete search history.

(56) References Cited

U.S. PATENT DOCUMENTS

| 10,548,512 | B2 * | 2/2020 | Hausdorff | A61B 5/6831 |
| 2006/0185432 | A1 * | 8/2006 | Weinberg | G01C 21/16 |
| | | | | 73/510 |
| 2010/0033422 | A1 * | 2/2010 | Mucignat | G06F 1/1626 |
| | | | | 702/141 |
| 2012/0239259 | A1 * | 9/2012 | McCabe | B62B 3/0612 |
| | | | | 701/50 |
| 2013/0085700 | A1 * | 4/2013 | Modi | G01C 22/006 |
| | | | | 702/160 |
| 2013/0201316 | A1 * | 8/2013 | Binder | G07C 3/02 |
| | | | | 701/2 |
| 2018/0139518 | A1 * | 5/2018 | Touma | A63B 43/00 |
| 2019/0278294 | A1 * | 9/2019 | Shimada | G05D 1/0274 |

* cited by examiner

*Primary Examiner* — Alesa Allgood
*Assistant Examiner* — Byung Ro Lee
(74) *Attorney, Agent, or Firm* — Lindauer Law, PLLC

(57) ABSTRACT

Operation of a device may be influenced based on whether the device is being tilted or has been picked up. Accelerometers gather accelerometer data that is processed to determine a reference pose. The reference pose is determined by analyzing the accelerometer data to determine "quiet" periods of accelerometer data. A moving average of the quiet periods is used to determine the reference pose. One or more override techniques may be used to compensate for noise in the accelerometer data, such as produced by the device playing music. The accelerometer data may be processed to compensate for other influences, such as intended movement of the device by one or more actuators. This processed data is compared to the reference pose. Responsive to the processed data exceeding a threshold value, the device may stop moving the one or more actuators, present output on a user interface, and so forth.

20 Claims, 6 Drawing Sheets

SYSTEM TO DETERMINE DEVICE DISPOSITION

BACKGROUND

It is useful to know a physical disposition of a device, such as whether the device has been tipped over, is being held, and so forth.

Computer Program Listing

A computer program listing appendix as expressed in the Python programming language is submitted with this disclosure and is hereby incorporated by reference for all that it contains.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
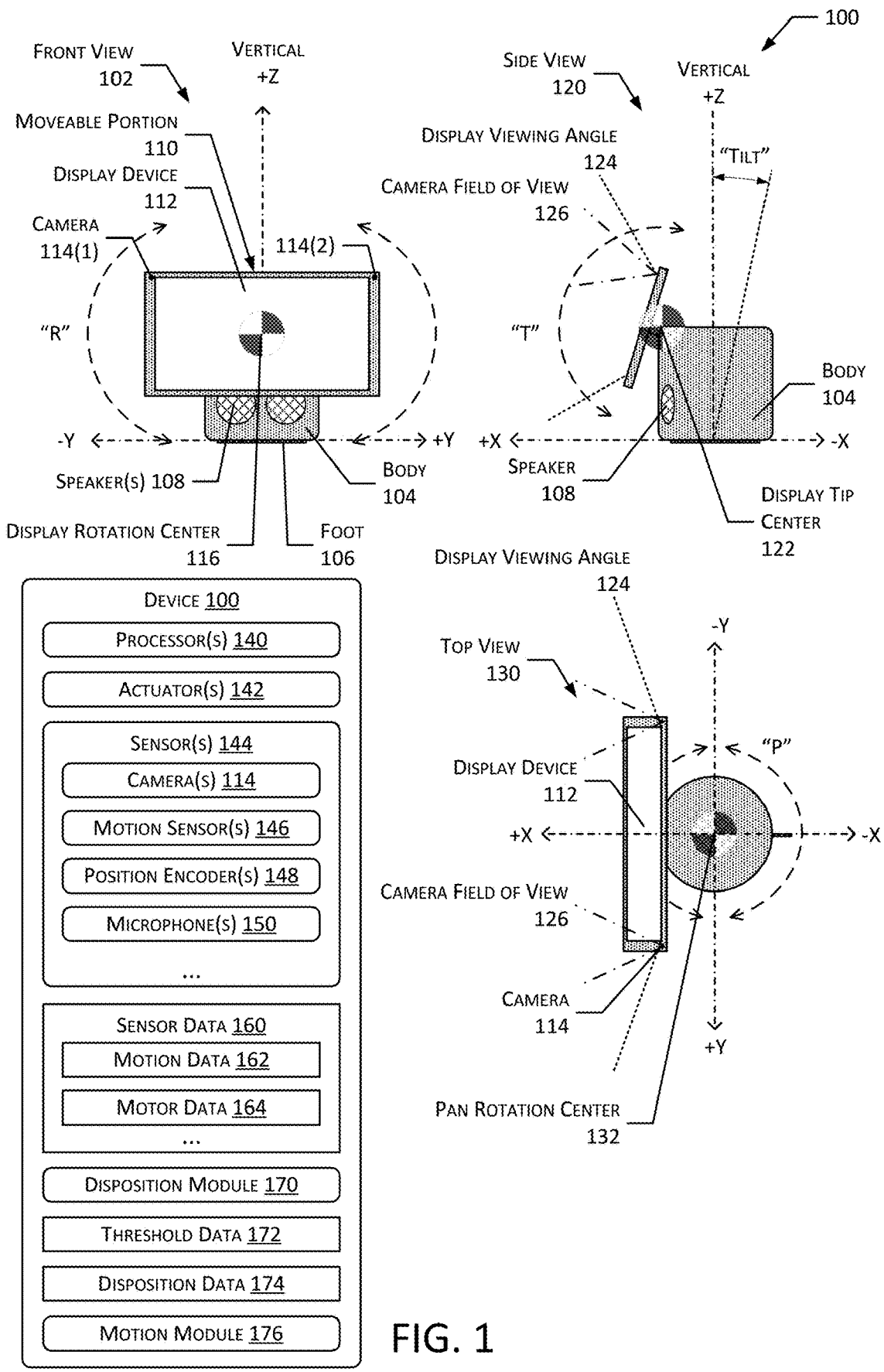
FIG. 1 illustrates a device to determine physical disposition, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A device may have several possible physical dispositions, such as being at rest on a surface, being held, being tipped over, and so forth. The operation of the device may be based on, or responsive to, this disposition. In one implementation, a device may be able to move with respect to one or more axes. For example, the device may have a normal operating disposition in which the device is at rest on a surface such as a table or countertop. An actuator such as a motor may be used to rotate the device with respect to a vertical axis. By rotating the device, a portion of the device, such as including a display, may be panned left and right with respect to a physical space. During operation, this panning may allow the device to present an image on the display device at an angle that is convenient to a person moving about within the physical space. For example, during presentation of video content, as the user moves about the physical space, one or more actuators may move the device, or portion to which the display is affixed, to attempt to keep the display visible to the user. While the device is at rest on a counter, the actuators may operate. However, if the physical disposition is such that the device has tipped beyond a certain angle, the actuators may be stopped and further motion inhibited until the device is returned to a more upright disposition.

In some situations, the device may be picked up by a user, pet, robot or other device, and so forth. Operation of the device may be modified responsive to this disposition. For example, actuator operation may be inhibited to prevent possible injury to the user or damage to the device.

Traditional systems to determine disposition are prone to errors. As a result of the poor output from these traditional systems, they tend to result in erratic behavior. For example, tilt determinations are susceptible to substantial error, reporting false positives when no tilt beyond a certain angle is taking place or false negatives when an actual tilt does exceed that threshold angle. In another example, determinations of whether a device is being held are even less accurate. For example, external influences such as vibrations from music, trucks passing by, people moving, and so forth may result in false positives indicating the device is being held, while the device is actually still at rest. Particularly problematic is noise with relatively high frequency components. High frequency components can introduce mechanical resonances that may result in false reports of movement. The problem is made worse as these mechanical resonances may be more difficult to characterize as mechanical resonance may change due to various factors such as changes in a surface supporting a device. This results in many false reports of movement in situations where the device includes a speaker, actuator, or other internal source of vibration or movement.

Described in this disclosure are techniques for determining disposition data indicative of a physical disposition of a device. In one implementation, the disposition data may indicate the device as being in one of two states: "no motion" or "in motion". The "in motion" state may be representative of the device being tipped beyond a threshold angle or being held by an external actor, such as a user, pet, robot, and so forth. The "no motion" state may be representative of the device maintaining a tip that is less than the threshold angle and is resting on a supporting surface. In another implementation the disposition data may indicate other states, such as "no motion", "in motion", "tipped over", and so forth.

The disposition data is determined by using sensor data acquired from a plurality of motion sensors. The motion sensors may comprise one or more multi-axis sensors, such as multi-axis accelerometers, multi-axis gyroscopes, multi-axis gyrometers, and so forth. For example, the motion sensors may comprise three linear accelerometers oriented with mutually orthogonal axes. In another example, the motion sensors may comprise an inertial measurement unit (IMU) comprising a plurality of accelerometers and a plurality of rotation sensors such as gyroscopes, gyrometers, and so forth.

Sensor data acquired using the motion sensors is processed to determine a compensated value that takes into account motion of the device, or a portion thereof. For example, the actuator may move a portion of the device that includes the motion sensor. The known motion of the device is subtracted from the motion data to determine the compensated data.

The compensated data may be further processed to provide processed data indicative of motion of the device or a portion thereof. For example, the processed data may comprise values indicative of roll, pitch, and acceleration. In implementations where the motion sensors consist of linear accelerometers, the rotations with respect to individual axes may be calculated. In comparison, in implementations where the motion sensors comprise linear accelerometers and rotation sensors such as gyroscopes, the roll and the pitch may be measured directly in the sensor data. The processed data may be indicative of one or more of roll with respect to an X axis, pitch with respect to a Y axis, tilt is an inclination relative to a Z axis that is vertical, or "r" indicative of an overall acceleration magnitude. The overall acceleration magnitude may comprise a square root of the sum of squared linear accelerations along all measured axes.

The processed data is processed by a reference pose module that determines a reference pose. The reference pose is indicative of an orientation of the device that will subsequently be used as a basis for comparison. The reference pose is adjustable over time, allowing the device to adapt to various situations. For example, the reference pose allows for the device to be placed on a surface that may be tilted and still operate.

Processed data is determined from the acquired sensor data over a time interval. Statistics associated with the time interval may be determined for a moving window of the data stored in the buffer. For example, a moving average of pitch, moving average of roll, and the overall acceleration magnitude may be calculated and stored in the buffer. In another example, a standard deviation of the roll, standard deviation of the pitch, mean of the overall acceleration magnitude, and so forth may be calculated and stored in the buffer.

The statistics in the buffer may be processed to determine a time interval or "quiet zone" in which the statistics are representative of motion below specified thresholds. Once a quiet zone is determined, the statistics associated with that quiet zone may be used as a reference pose. The process is ongoing, with the reference pose being updated as conditions change.

In some circumstances the determination of the "quiet zone" may be impaired by ongoing stimuli or intentional movement of the device itself. For example, music being presented by a speaker on the device, or music from an external source, may produce noisy sensor data in which there is too much variation for a quiet zone to be determined. In another example, an intentional movement of the device, such as operating an actuator to pan the display, may result in too much variation for the quiet zone to be determined. Different override techniques may be used to address these situations.

A first override technique accounts for ongoing noise by assessing mean values of consecutive quiet zone buffers. If the mean values are very similar, the reference position may be determined even though the statistics exceed threshold values.

A second override technique accounts for motions resulting from movement of one or more actuators of the device. For example, the process to determine the reference position may be responsive to a command to operate an actuator on the device.

The disposition module may implement a finite state machine that uses as inputs counts that indicate how many times a particular set of conditions have occurred since reset or initialization of the count. For example, occurrence of a "low trigger" may be determined to have occurred when movement as indicated by statistics based on the processed data is less than one or more threshold values. In another example, occurrence of a "high trigger" may be determined to have occurred when movement as indicated by the statistics based on the processed data is greater than one or more threshold values.

The finite state machine (FSM) may use counts that are based on occurrence of triggers to determine the disposition data and implement a hysteresis band. For example, to transition from a "no motion" state to an "in motion" state, the FSM may require a first count of trigger occurrences that is greater than a first threshold. A trigger occurrence may be determined when specified conditions are met. The logic used to determine the specified conditions for triggers may vary. For example, logic associated with a low trigger may require several conditions to be met, while logic associated with a high trigger may require one or more conditions be met.

In some implementations data from other sensors may be used to modify one or more of the trigger thresholds. For example, a microphone may be used to determine an ambient sound level. Continuing the example, the high trigger threshold may be proportionate to the ambient sound level, with greater sound levels increasing the high trigger threshold while lower sound levels decrease the high trigger threshold.

The system described in this disclosure is able to reliably and robustly determine device disposition during a wide variety of conditions. The system is able to operate using data from inexpensive sensors, such as a three-axis accelerometer. The system also requires minimal computational resources and memory, allowing for low power operation. The device disposition data may then be used to modify or operate the device.

Illustrative System

FIG. 1 illustrates a device 100 that may implement a system to determine physical disposition of the device, according to some implementations. A front view 102 of a device 100 is shown. The device 100 may include a body 104 that is supported by a foot 106. The device 100 may include one or more speakers 108. For example, the speakers 108 may be mounted within the body 104 as shown here. The device 100 may include a moveable portion 110 that can move with at least one degree of freedom with respect to the body 104. The moveable portion 110 of the device 100 may include a display device 112, one or more camera(s) 114, and so forth. In some implementations the moveable portion 110 may be able to rotate, relative to the body 104, in a direction "R" with respect to a display rotation center 116. For example, the moveable portion 110 may be able to rotate about an axis that is perpendicular to a plane of the display device 112 and centered on the display rotation center 116.

A side view 120 of the device 100 shows some additional features. In some implementations, the moveable portion 110 may move with respect to the body 104. For example, the moveable portion 110 may be rotatable with respect to a display tip center 122 that allows the moveable portion 110 to be tipped in direction "T".

A display viewing angle 124 is shown indicating a viewable area associated with the display device 112. A camera field of view (FOV) 126 is also shown. The camera FOV 126 indicates with a dashed line the solid angle within which one of the cameras 114 obtains image data indicative of an image of a scene in a physical space. In some implementations the camera(s) 114 may comprise a charge coupled device (CCD), complementary metal oxide semiconductor (CMOS) device, microbolometer, and so forth. The device 100 or systems in communication with the device 100 may use at least a portion of the image data acquired by the camera(s) 114 for object recognition, user communication, and so forth. For example, the camera(s) 114 may be used for videoconferencing or for acquiring pictures for the user.

A top view 130 also depicts the display device 112 and associated display viewing angle 124 and the camera(s) 114 and associated camera FOV 126. The device 100 may rotate along a vertical axis centered on a pan rotation center 132. For example, the device 100 may pan to orient the camera(s) 114 in a particular direction.

The device 100 may include a power source (not shown) to provide electrical power suitable for operating the components in the device 100. For example, power may be provided by connection to an external power source such as a building main, batteries, wireless power transfer, capacitors, fuel cells, and so forth.

The device 100 may include one or more hardware processors 140 ("processors") configured to execute one or more stored instructions. The processors 140 may comprise one or more cores. The processors 140 may include microcontrollers, systems on a chip, field programmable gate arrays, digital signal processors, graphic processing units, general processing units, and so forth.

Also shown are three mutually orthogonal axes (X,Y,Z) designated with respect to the body 104 of the device 100. In this illustration, the X axis extends front to back, the Y axis extends left to right, and the Z axis extends vertically. Roll indicates rotation with respect to the X axis, pitch indicates rotation with respect to the Y axis, and tilt of the device 100 is indicative of inclination of the device 100 based on an angle between local vertical and the Z axis of the device 100.

The device 100 includes one or more actuators 142. The actuators 142 may comprise one or more of a motor, solenoid, piezoelectric material, electroactive polymer, shape-memory alloy, and so forth. The actuators 142 produce movement in one or more of the device 100 relative to an external environment, relative motion between parts of the device 100, and so forth. For example, an actuator 142 may be used to pan or rotate the body 104 relative to the foot 106, producing rotation about the pan rotation center 132. In another example, an actuator 142 may be used to move the moveable portion 110 relative to the body 104.

The device 100 may include one or more sensors 144. The sensors 144 may include camera(s) 114, motion sensor(s) 146, position encoder(s) 148, microphone(s) 150, radar, sonar, depth cameras, a radio receiver, and so forth. The cameras 114 may acquire image data.

The motion sensors 146 may include a plurality of gyroscopes and accelerometers arranged along different axes that during operation acquire motion data 162. The gyroscope or gyrometer may provide information indicative of rotation of an object affixed thereto. The accelerometer provides information indicative of a direction and magnitude of an imposed linear acceleration. Data such as rate of change, determination of changes in direction, speed, and so forth may be determined using one or more of the accelerometer, gyroscope, or gyrometer. The motion sensor 146 may comprise mechanical, optical, micro-electromechanical, or other devices. The motion sensor 146 may include the gyroscope and the accelerometer in a prepackaged solid-state unit. For example, the motion sensors 146 may comprise three linear accelerometers oriented with mutually orthogonal axes in a single package. In another example, the motion sensors 146 may comprise an inertial measurement unit (IMU) comprising a plurality of accelerometers and a plurality of rotation sensors such as gyroscopes or pyrometers.

During operation, the position encoders 148 provide motor data 164 indicative of a position of at least a portion of an actuator 142. The position encoder 148 may be integral with an actuator 142, or may be an external device added to or used in conjunction with the actuator 142. In one implementation an integral position encoder 148 may utilize hall effect sensors, magnets, and other components within a rotary motor to determine rotation of a shaft. For example, a brushless direct current (BLDC) motor or a controller used to drive the BLDC may provide information as to rotational speed, rotational count, rotational direction, and so forth. In another implementation, an optical encoder using a photodiode and light to detect a code printed on an encoder wheel may be used. In another implementation, a combination of techniques may be used. For example, an optical encoder may be used to determine a reference point, such as a zero value. Subsequently, data from a motor encoder integrated into an electric motor may be used to determine a position relative to the reference point.

The sensor data 160 may comprise data from the other sensors 144. For example, the sensor data 160 may comprise data acquired by one or more of the microphone, radar, radio receiver, and so forth. The sensor data 160 may be processed by a disposition module 170.

The disposition module 170 may execute at least in part on the processor 140 and determines disposition data 174 that is indicative of a physical disposition of the device 100. In one implementation, the disposition data 174 may indicate the device 100 as being in one of two states: "no motion" or "in motion". The "in motion" state may be representative of the device being tipped beyond a threshold angle or being held by an external actor, such as a user, pet, robot, and so forth. The "no motion" state may be representative of the device maintaining a tip that is less than the threshold angle and is resting on a supporting surface. In another implementation the disposition data may indicate other states, such as "no motion", "in motion", "tipped over", and so forth. For example, "in motion" may be indicative of the device 100 being held, while "tipped over" is indicative of the device 100 being tilted at an angle greater than the threshold angle.

The disposition module 170 may determine the disposition data 174 by assessing the sensor data 160 with respect to one or more thresholds specified by the threshold data 172. For example, the threshold data 172 may specify the threshold angle of tilt that is associated with the device 100 tipping over. In one implementation, the threshold angle of tilt may be determined experimentally, such as by placing the device 100 on a tilt table that is then inclined until the device 100 topples. The threshold data 172 may include other threshold values as described below, such as threshold count values, and so forth. In another implementation, the threshold angle of tilt may be determined based on accessories associated with the device 100. For example, the threshold angle of tilt may be determined based on placing a portion of a power cord used to provide electrical power to the device 100 under the foot 106.

Operation of the speakers 108, actuators 142, and so forth may result in vibration that can introduce noise into motion data 162. For example, operation of the speakers 108 may shake the body 104, producing transient accelerations that are represented by the motion data 162 produced by the motion sensors 146. The disposition module 170 may compensate for these and other factors during operation. The disposition module 170 is discussed in more detail with regards to FIGS. 2-6.

The disposition data 174 may be used by other modules or devices within the device 100. For example, the disposition data 174 may be provided to a motion module 176. In some implementations, the disposition data 174 may be sent to an external device, such as a server, robot, and so forth.

The motion module 176 may execute at least in part on the processor 140. The motion module 176 may determine or receive one or more movement instructions that direct one or more of the actuators 142 to move at least a portion of the device 100. For example, the movement instructions may direct an actuator 142 to pan the device 100 to a relative position of +71 degrees at a first time. Responsive to these movement instructions, the motion module 176 operates the actuator 142. Operation of the motion module 176 may be dependent upon the disposition data 174. For example, based on disposition data 174 indicative of "no motion", the motion module 176 may permit the operation of the actuator 142 to pan the device 100. Continuing the example, based on disposition data 174 indicative of "in motion", the motion module 176 may cease movement of the actuator 142. Once the disposition data 174 returns to "no motion", the motion module 176 may resume movement of the actuator 142.

The motion module 176 may attempt to have the device 100 follow an entity, such as a user, that is moving in the scene. For example, the motion module 176 may use one or more of output from the microphone array, the image data, and so forth to determine where the user is relative to the device 100. Once determined, movement instructions may be generated that direct the device 100 to turn towards the object or where the object is expected to be at the first time. In one implementation, during a video call the motion module 176 attempts to keep a particular user centered in the video being sent. In implementations such as depicted here where the display device 112 and the camera 114 are mounted adjacent to one another, such action of following also helps maintain the user within a central viewing area of the display device 112, allowing the user to more clearly see the image on the display device 112.

Figure 2:
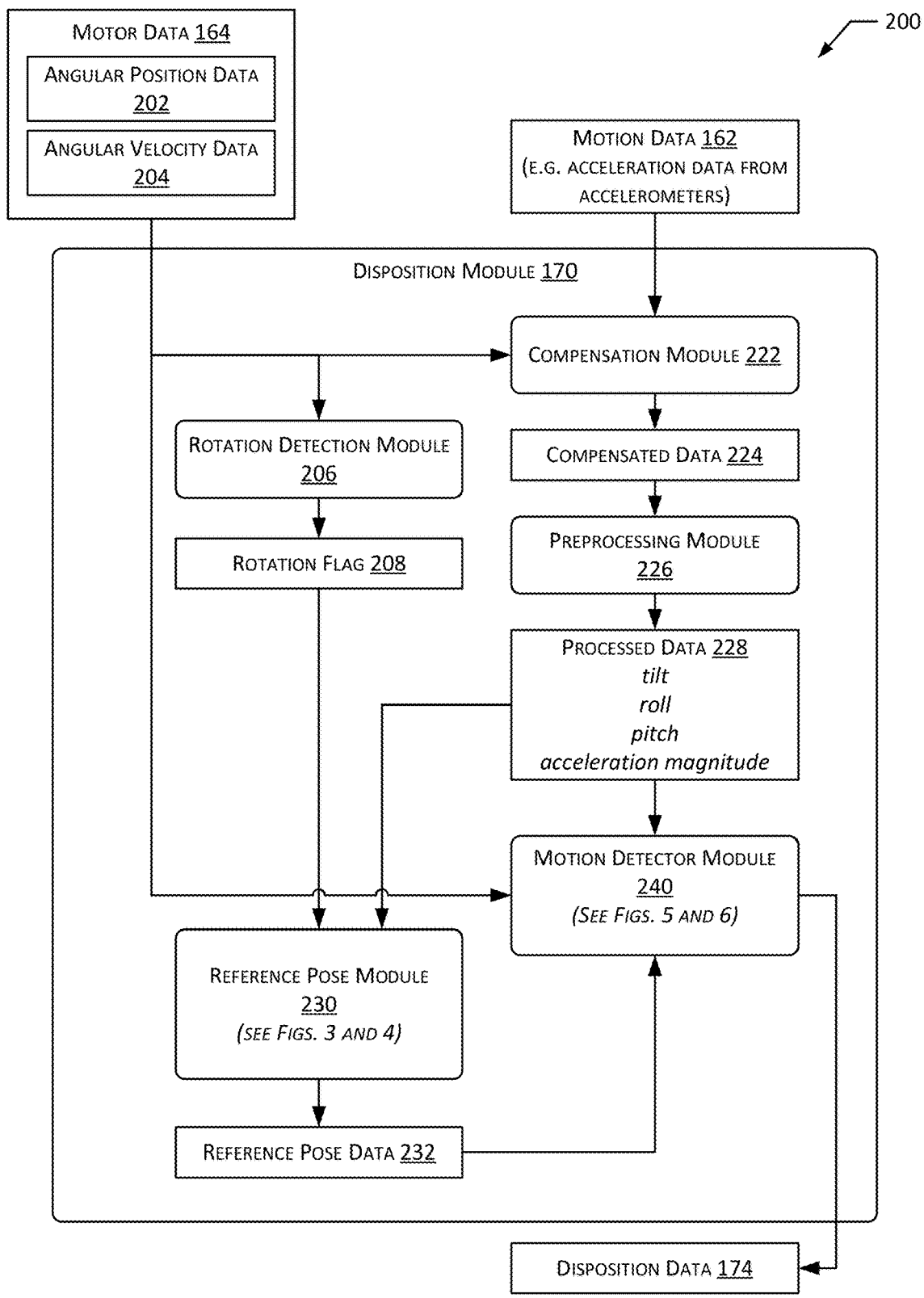
FIG. 2 illustrates a disposition module to determine physical disposition using a reference pose and sensor data, according to some implementations.

FIG. 2 illustrates at 200 the disposition module 170 to determine disposition data 174 that is indicative of a physical disposition of the device 100, according to some implementations.

The disposition module 170 may accept as input the sensor data 160, such as motion data 162, motor data 164, and so forth. In one implementation, the motion data 162 may comprise data indicative of linear acceleration, obtained from a motion sensor 146 comprising a plurality of accelerometers having mutually orthogonal axes. For example, the motion sensor 146 may comprise a 3-axis linear accelerometer. In some implementations, the motion data 162 may result from processing raw data acquired by the motion sensor 146 that has been adjusted using previously stored calibration values.

The motion sensor(s) 146 may be mounted on the device such that any motion of the device 100 itself, or a portion thereof, may move the motion sensor 146. Motion data 162 acquired using the motion sensors 146 is processed to determine compensated data 224 that takes into account motion of the device 100, or a portion thereof. For example, the actuator 142 may move a portion of the device 100, such as the body 104, that includes the motion sensor 146. The known motion of the device 100 as indicated by the motor data 164 may be used to subtract, from the motion data 162, the movement that is associated with the known motion.

The compensation module 222 may accept as input motor data 164. In implementations where the actuator 142 comprises a rotary motor, the motor data 164 may comprise one or more of angular position data 202, angular velocity data 204, angular acceleration data (not shown), and so forth. The motor data 164 may be produced by the motor or actuator 142, or an encoder associated with the motor or actuator 142. Because the arrangement of the motion sensor(s) 146 relative to the axis of movement is known, the compensated data 224 can be calculated. For example, the X axis accelerometer may detect centripetal acceleration due to rotation while the Y axis accelerometer may detect tangential acceleration due to the rotation. In some implementations, the Z axis accelerometer may be arranged such that it is parallel to the axis of rotation, and so is not affected by the rotation. For example, an implementation in which the motion data 162 comprises linear acceleration data obtained from linear accelerometers may compensate for rotation of the device 100 using the following equations:

$$x_{acc} = R \times \omega^2 \qquad \text{(Equation 1)}$$

$$y_{acc} = R \times \alpha \qquad \text{(Equation 2)}$$

where:

$x_{acc}$ is a value indicative of compensated acceleration along the X axis, $\omega$ is the angular velocity data 204, R is indicative of the radial distance from an axis of rotation and the accelerometers, and $\alpha$ is angular acceleration (derivative of $\omega$ with respect to time), and $y_{acc}$ is a value indicative of compensated acceleration along the Y axis.

Continuing the example, the compensated data 224 may comprise the $x_{acc}$ and the $y_{acc}$ data. While the example describes the use of angular velocity data 204, in other implementations other data may be used. For example, changes in angular position data 202 over time may be used to determine angular velocity data 204.

In implementations where the Z axis accelerometer is not arranged parallel to the axis of rotation, some motion may be detected along the Z axis during movement. In these implementations, compensation for motion along all three axes may be performed using a regression analysis. Instead of using Equations 1 and 2, data may be collected and used to fit the error for each axis.

In some implementations, the value of R may be determined based on the physical design of the device 100. In other implementations, the value of R may be determined by acquiring actual measurements and minimizing the equations.

The compensated data 224 may be further processed by a preprocessing module 226 to determine processed data 228. The processed data 228 is indicative of motion of the device 100, or a portion thereof. For example, the processed data 228 may be indicative of one or more of tilt relative to a Z axis that is vertical, roll with respect to an X axis, pitch with respect to a Y axis, or acceleration magnitude "r". The acceleration magnitude may comprise a square root of the sum of squared linear accelerations along all measured axes. In implementations where the motion sensors 146 consist of linear accelerometers, the rotations with respect to individual axes may be calculated. For example, the following equations may be used to calculate the processed data 228 in some implementations using the values provided by the compensated data 224:

$$\text{Acceleration Magnitude } (r) = \sqrt{x^2 + y^2 + z^2} \quad \text{(Equation 3)}$$

$$\text{tilt} = \left(\frac{180}{\pi}\right)\cos^{-1}\left(\frac{z}{r}\right) \quad \text{(Equation 4)}$$

$$\text{roll} = \left(\frac{180}{\pi}\right)a\tan2(y, z) \quad \text{(Equation 5)}$$

$$\text{pitch} = \left(\frac{180}{\pi}\right)a\tan2\left(-x, \sqrt{y^2 + z^2}\right) \quad \text{(Equation 6)}$$

In implementations where the motion sensors 146 comprise linear accelerometers and rotation sensors such as gyroscopes, the roll and the pitch may be measured directly and indicated in the motion data 162.

A motion detector module 240 may accept the processed data 228 as input. The motion detector module 240 may also accept other data, such as motor data 164. The motion detector module 240 may also accept reference pose data 232 indicative of a reference pose. The reference pose is indicative of a pose of the device 100 that is used as a subsequent reference to determine if the device 100 is being held, tilted, or other changes in disposition. The reference pose data 232 is determined by the reference pose module 230. The reference pose data 232 may change over time. The reference pose module 230 may accept as inputs one or more of the processed data 228, a rotation flag 208, or other data. The reference pose module 230 is discussed in more detail with regard to FIGS. 3 and 4.

The motion detector module 240 may determine occurrences of "low triggers" and occurrences of "high triggers". Counts of these triggers may be maintained. Depending on the counts and respective thresholds, the motion detector module 240 may determine the disposition data 174. In some implementations the motion detector module 240 may use a finite state machine (FSM) to determine the disposition data 174. The FSM is discussed with regard to FIG. 5. The conditions used to determine occurrence of "low triggers" and "high triggers" are discussed with regard to FIG. 6.

A rotation detection module 206 may be used to determine the rotation flag 208, or other data indicative of one or more actuators 142 of the device 100 being operated. The rotation detection module 206 may accept motor data 164 as input. For example, if the motor data 164 indicates that the actuator 142 is rotating at least a portion of the device 100, the rotation flag 208 may be set to a specified value, such as "true". In other implementations, the rotation detection module 206 may use data from other modules on the device 100. For example, the motion module 176 may issue instructions to the actuator 142 to operate an actuator 142. The rotation detection module 206 may receive data from the motion module 176, such as the instructions, and determine the rotation flag 208 based on that data. Continuing the example, instead of the motor data 164, the rotation flag 208 may be based on instructions that are expected to result in operation of the actuator 142.

In some implementations the rotation detection module 206 may determine the rotation flag 208 based on data from a subset of the motion sensors 146. For example, a particular motion sensor 146 located in a moveable portion 110 may be used to provide motion data 162 that is used to determine manual movement of the moveable portion 110 responsive to an outside actor, such as a user pushing on the moveable portion 110.

Figure 3:
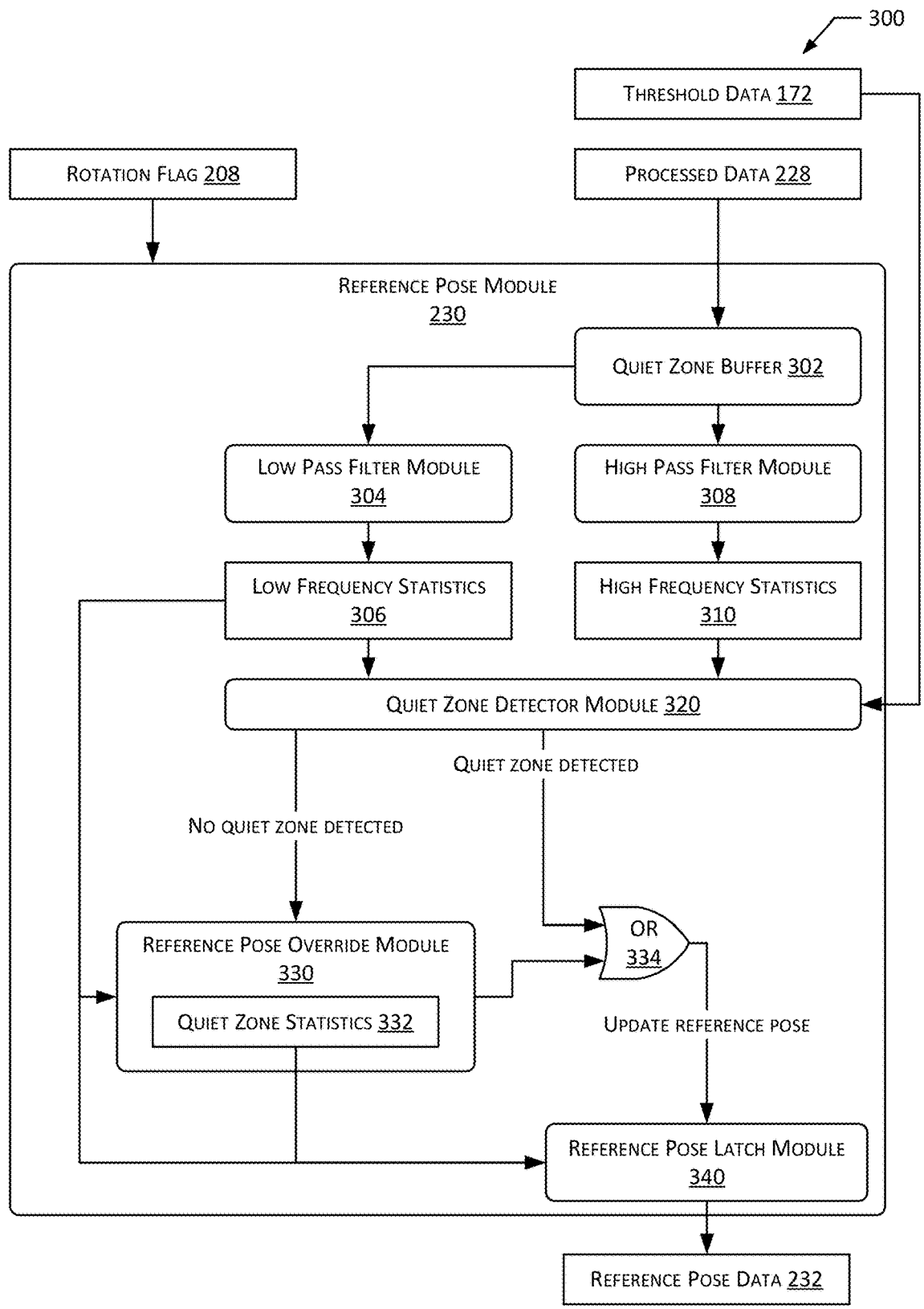
FIG. 3 illustrates a reference pose module to determine the reference pose, according to some implementations.

FIG. 3 illustrates at 300 a reference pose module 230 to determine reference pose data 232 indicative of the reference pose, according to some implementations. The reference pose module 230 may accept as input the processed data 228 and in some implementations the rotation flag 208. The reference pose module 230 may be implemented as a set of instructions executing on the one or more processors 140.

The processed data 228 is added to a quiet zone buffer 302. The quiet zone buffer 302 may accumulate samples corresponding to a time interval of some length of time. For example, the quiet zone buffer 302 may include processed data 228 for 1.5 seconds. The processed data 228 in the quiet zone buffer 302 is processed by a low pass filter module 304 to determine low frequency statistics 306. For example, the low frequency statistics 306 may comprise a mean or average of values within the quiet zone buffer 302. The processed data 228 in the quiet zone buffer 302 is processed by a high pass filter module 308 to determine high frequency statistics 310. For example, the high frequency statistics 310 may comprise a standard deviation, variance, mean or average of values within the quiet zone buffer 302.

A quiet zone detector module 320 uses one or more of the low frequency statistics 306 or the high frequency statistics 310 to determine that a "quiet zone" is present. For example, the high frequency statistics 310 may comprise a set of standard deviation values for the data stored in the quiet zone buffer 302. The quiet zone buffer 302 provides a window of samples of processed data 228 that change over time as the buffer is filled in a first in, first out (FIFO) fashion. For example, as a new sample of processed data 228 is stored in the quiet zone buffer 302 an oldest sample may be discarded. In one implementation, the quiet zone detector module 320 may compare one or more of the standard deviation measurements with respective threshold values. For example, a standard deviation of the tilt values in the quiet zone buffer 302 is calculated and compared to a maximum permitted tilt threshold, a standard deviation of the roll values in the quiet zone buffer 302 is calculated and compared to a maximum permitted roll threshold, and a standard deviation of the pitch values in the quiet zone buffer 302 is calculated and compared to a maximum permitted roll threshold. These thresholds may be specified based on the physical configuration of the device 100. For example, the maximum permitted thresholds may specify values which the device 100 is not to exceed to avoid toppling. The acceleration magnitude for the values in the quiet zone buffer 302 may also be calculated and compared to an acceleration magnitude threshold. Continuing the example, the acceleration magnitude threshold may be between 0.9 and 1.1, with a value of 1 being expected when no motion is present due to gravity.

If all of these conditions as described above for a "quiet zone" are met, the quiet zone detector module 320 may provide output to block 334 indicating that a quiet zone has been detected and the quiet zone buffer contents are suitable to use to determine the reference pose data 232. Block 334 may operate as a logical "OR", in which if any input is asserted as true, the output will be true.

The thresholds used by the quiet zone detector module 320 may be determined experimentally or empirically. For example, the thresholds may be set based on experimentation to determine acceptable performance in the determination of disposition data 174. In another example, the thresholds may be determined by calculating an average of the variations in processed data 228 while a device 100 is in a known stationary position and adding a margin such as 5% to that average.

If the conditions assessed by the quiet zone detector module 320 for a "quiet zone" are not met, a reference pose override module 330 may determine if one or more override conditions are present. The reference pose override module 330 may consider longer-term changes to contents of the quiet zone buffer 302. In one implementation, quiet zone statistics 332 may be determined that are indicative of the quiet zone buffer 302 over time. For example, the low frequency statistics 306 for successive windows of time for the last 1.5 seconds may be used to determine the quiet zone statistics 332. Continuing the example, the quiet zone statistics 332 may be indicative of an average of the mean values of the quiet zone buffer 302 at successive times. This average of the mean values may be compared to a threshold value. In another implementation a standard deviation of the mean values may be calculated and compared to a threshold value. By using the reference pose override module 330, the reference pose module 230 is able to operate in situations where the device 100 is stationary but is subjected to stimulus, such as noise in the motion data 162 due to loud music either presented by the speakers 108 on the device or from another source. If comparison of the quiet zone statistics 332 to a threshold value indicated by the threshold data 172 indicates that the quiet zone buffer 302, even if noisy, is stable over a relatively long time, the reference pose override module 330 may provide output to block 334 indicating that a quiet zone has been detected. In some implementations, the quiet zone statistics 332 may be used to determine the reference pose data 232. For example, the respective averages of the mean of the tilt, roll, pitch, and acceleration magnitude may be used to determine the reference pose data 232.

A reference pose latch module 340 may use output from block 334 to determine whether to latch and determine the reference pose data 232. For example, if either the quiet zone detector module 320 determines a quiet zone is detected, or the reference pose override module 330 determines an override condition is present, the reference pose latch module 340 may use the available data to determine the reference pose data 232 indicative of a reference pose.

The reference pose data 232 may change over time. As the reference pose module 230 accepts ongoing inputs of processed data 228 and the contents of the quiet zone buffer 302 change over time, so too will the reference pose data 232 be revised.

It may be necessary to advance the operation of the reference pose module 230 to more quickly determine reference pose data 232. For example, if an actuator 142 is operated to rotate the device 110, the data present in the quiet zone buffer 302 may no longer be relevant. In some implementations, responsive to receipt of a rotation flag 208, the reference pose module 230 may perform one or more steps such as increasing the sampling rate of the motion sensors 146, clearing the quiet zone buffer 302, and so forth. In this way, the reference pose module 230 will more quickly produce reference pose data 232 that dynamically changes as the device 100 itself is moving.

Figure 4:
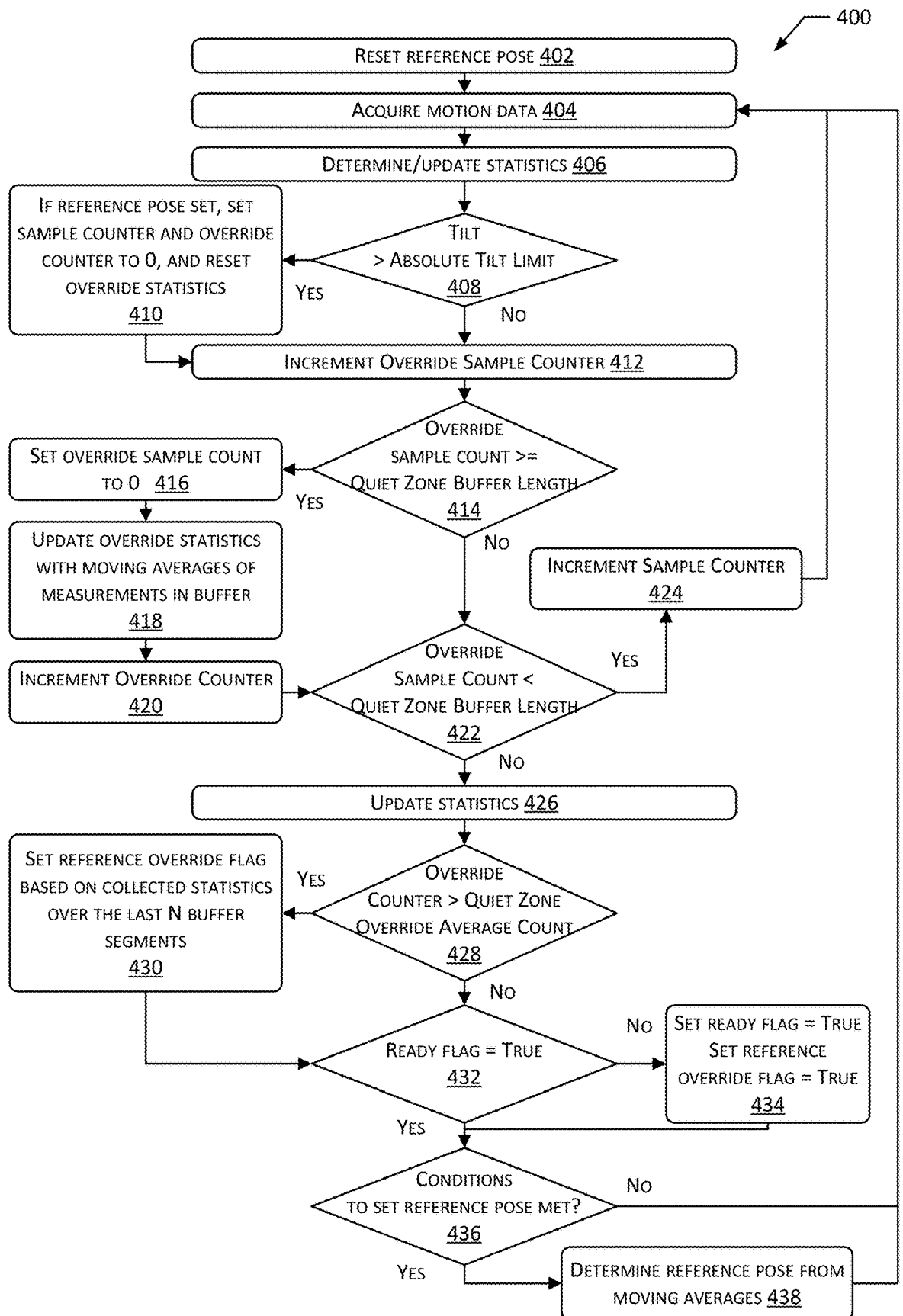
FIG. 4 is a flow diagram of a process for determining a reference pose, according to some implementations.

FIG. 4 is a flow diagram 400 of a process for determining reference pose data 232, according to some implementations. The process may be implemented by the reference pose module 230 executing on the one or more processors 140.

At 402 the reference pose data 232 is reset to one or more specified values. For example, the reference pose data 232 may be set to specified values of 0 tilt, 0 roll, 0 pitch, 1 acceleration magnitude.

At 404 motion data 162 is acquired. For example, the motion sensors 146 acquire accelerometer data from a multi-axis accelerometer. The acquired motion data 162 may be processed as described above and the processed data 228 may be stored, such as in the quiet zone buffer 302.

At 406 statistics are determined or updated based on the processed data 228. For example, one or more of the low frequency statistics 306 or the high frequency statistics 310 may be calculated for the contents of the quiet zone buffer 302. These statistics may include moving averages of the various measurements.

At 408, a value of the tilt as indicated by the statistics is compared to an absolute tilt limit. For example, the moving average of the tilt measurements in the quiet zone buffer 302 may be compared to the absolute tilt limit. The absolute tilt limit is indicative of a maximum permitted tilt that the device 100 may assume without danger of toppling over. The absolute tilt limit may be determined empirically or experimentally. For example, during testing the device 100 may be placed on a surface that is tilted until the device 100 topples. The absolute tilt limit may be some value less than the experimentally determine value, to provide some operating margin.

If at 408 the value of the tilt is greater than the absolute tilt limit, the process may proceed to 410. If false, the process may proceed to 412.

At 410, if the reference pose has been set, a sample counter and an override counter are each set to 0. For example, the sample counter may indicate the number of samples in the quiet zone buffer 302 that are used to determine statistics. The override counter may be used by the reference pose override module 330 to determine if an override condition occurs, such as a persistently noisy signal that exceeds the quiet zone detector module 320 conditions. At 410 the override statistics are also reset. For example, the quiet zone statistics 332 may be set to 0.

At 412 an override sample counter is incremented. The override sample counter is indicative of the number of motion data 162 that are considered by the reference pose override module 330.

At 414 a determination is made as to whether the override sample count is greater than or equal to a quiet zone buffer length. The quiet zone buffer length is indicative of a number of separate samples, such as acquired at different times, that the quiet zone buffer 302 stores. If yes, the process may proceed to 416. If no, the process may proceed to 422.

At 416 the override sample count is set to 0. The process may proceed to 418. At 418 the override statistics are updated with moving averages of the measurements in the buffer. For example, the quiet zone statistics 332 are updated, including moving averages of the measurements in the quiet zone buffer 302. The process then proceeds to 420.

At 420 the override counter is incremented. The process then proceeds to 422.

At 422 a determination is made as to whether the override sample count is less than the quiet zone buffer length. If yes, the process may proceed to 424. If no, the process may proceed to 426.

At 424, the sample counter is incremented, and the process may return to 404.

At 426 the statistics are updated based on the processed data 228. For example, one or more of the low frequency statistics 306, the high frequency statistics 310, or the quiet zone statistics 332 may be calculated for the contents of the quiet zone buffer 302. These statistics may include moving averages of the various measurements.

At 428 a determination is made as to whether the override counter is greater than a quiet zone override average count. The quiet zone override average count may comprise an average of the counts of the override counter. If yes, the process may proceed to 430. If no, the process may proceed to 432.

At 432 a determination is made as to whether a ready flag value is true. If yes, the process may proceed to 436. If no, the process may proceed to 434. The ready flag value of true indicates that the quiet zone buffer 302 is filled.

At 434 the ready flag may be set to true and the reference override flag may also be set to true. In some implementations, during operation the ready flag may remain asserted after the initial assertion, such as at 434.

At 434 the reference override flag is set based on the statistics corresponding to the last N buffer segments, where N is a nonzero positive integer value. The reference override flag is set to indicate that an override condition for the determination of the reference pose data 232 from the contents of the quiet zone buffer 302 has occurred. The process may then proceed to 436.

At 436 a determination is made as to whether one or more conditions to set the reference pose are met. If yes, the process may proceed to 438. If no, the process may return to 404.

As described above with regard to block 334 and the reference pose latch module 340, the determination to specify the reference pose data 232 may be responsive to a logical OR of one or more conditions including: the quiet zone being detected by the quiet zone detector module 320, a reference override flag from the reference pose override module 330, or assertion of a rotation flag 208.

At 438 the reference pose data 232 is determined. For example, the reference pose data 232 may be determined as the moving averages of the measurements in the quiet zone buffer 302. In other implementations, other calculations may be used. The process may then return to 404 to perform additional iterations.

Figure 5:
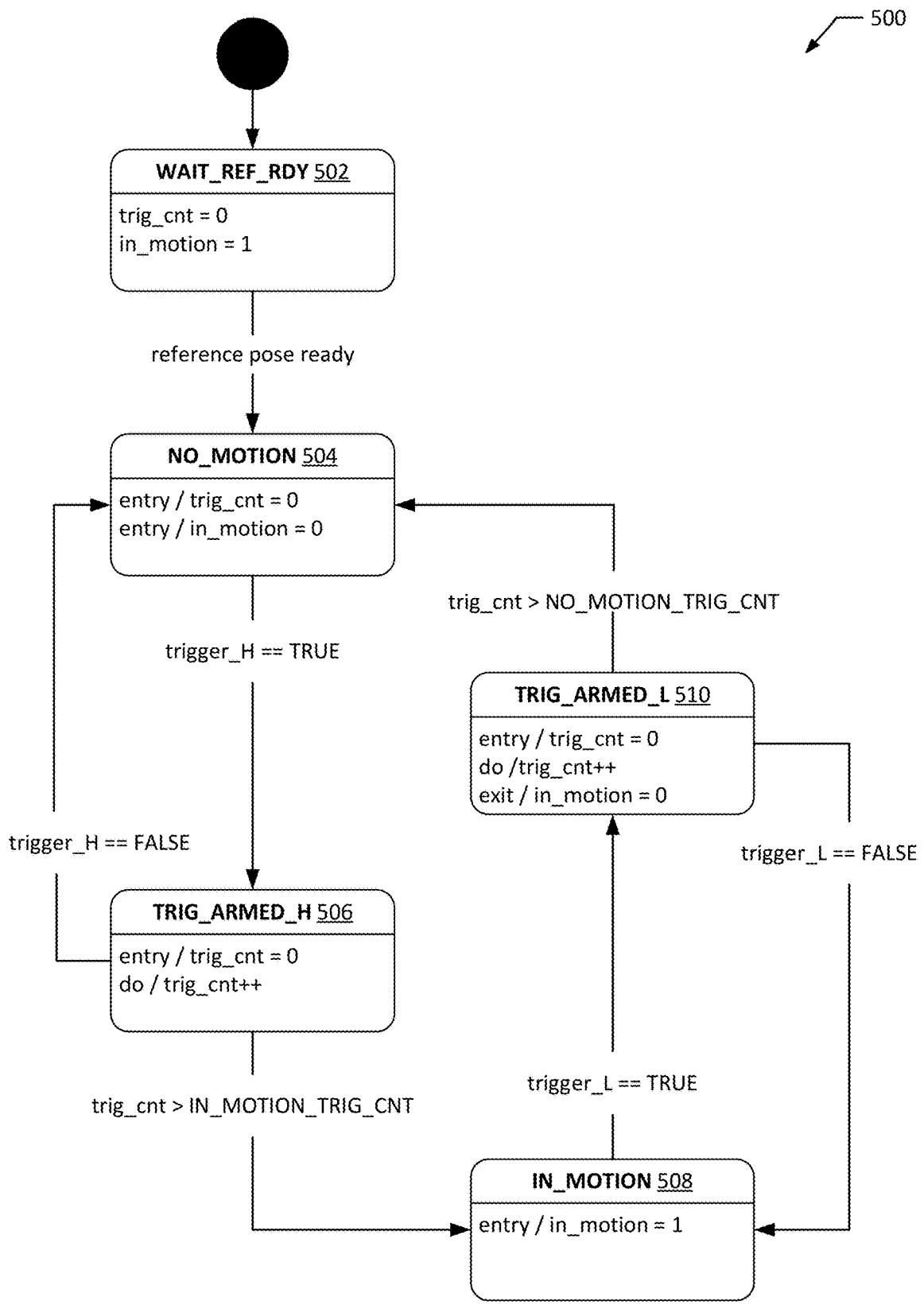
FIG. 5 illustrates a state diagram that may be implemented by a finite state machine for determining disposition of a device based on high triggers and low triggers, according to some implementations.

FIG. 5 illustrates a state diagram 500 that may be implemented by a finite state machine (FSM) for determining disposition of a device based on trigger counts, according to some implementations. The FSM may be implemented by the motion detector module 240 executing on the one or more processors 140.

The FSM described in this figure includes five states: WAIT_REF_RDY 502, NO_MOTION 504, TRIG_ARMED_H 506, IN_MOTION 508, and TRIG_ARMED_L 510.

The WAIT_REF_READY 502 state is associated with the start of the FSM. While in this state, the trigger count "trig_cnt" is zero and the reference pose is not yet available. In one implementation, the trigger count may be incremented based on low triggers and high triggers. The low triggers and high triggers occur when specified conditions have been determined, as described in FIG. 6. The "in_motion" value is asserted as "1" or true, indicating that the device 100 is in motion. This assertion prevents the device 100 from taking action, such as operating an actuator 142, until the reference pose data 232 is available and resulting disposition data 174 can be determined.

When the reference pose data 232 is ready, the state transitions to NO_MOTION 504. The NO_MOTION 504 state entry is a trig_cnt of 0 and in_motion is 0, indicating the device 100 is stationary.

In the NO_MOTION 504 state, if a high trigger is determined to have occurred, such as indicated by "trigger_H" being true, the state transitions to TRIG_ARMED_H 506. After entry into the TRIG_ARMED_H 506 state, the trig_cnt is incremented at each occurrence of trigger_H being true. If the trigger_H is false, the state transitions to NO_MOTION 504. If the trig_cnt is greater than an IN_MOTION_TRIG_CNT, the state transitions to the IN_MOTION 508 state. The IN_MOTION_TRIG_CNT is indicative of a threshold value of the trigger count that is associated with the device 100 being in motion.

In some implementations, the IN_MOTION_TRIG_CNT may be determined based on empirical testing. The IN_MOTION_TRIG_CNT may be adjusted based at least in part on sensor data 160. For example, audio data may be acquired using a microphone. The audio data may be processed to determine a value indicative of loudness of the sound represented by the audio data. The value of the IN_MOTION_TRIG_CNT may be determined based on the value indicative of loudness. For example, a first lookup table may be used to associate loudness values with particular trigger count thresholds. In another example, a calculation may use the loudness value as input and produce as output the trigger count threshold. The value of the IN_MOTION_TRIG_CNT may be proportionate to the loudness. For example, as the microphone detects an increase in noise, the trigger count threshold may increase, and vice versa.

After entry to the IN_MOTION 508 state, if a low trigger is determined to have occurred, such as indicated by a low trigger "trigger_L" being true, the state transitions to the TRIG_ARMED_L 510 state. Otherwise the state remains IN_MOTION 508.

In the TRIG_ARMED_L 510 state, the trig_cnt is incremented at each occurrence of trigger_L being true. If the trigger_L is false, the state transitions to the IN_MOTION 508 state. If the trig_cnt is greater than a NO_MOTION_TRIG_CNT, the state transitions to the NO_MOTION 504 state. The NO_MOTION_TRIG_CNT is indicative of a threshold value of the trigger count that is associated with the device 100 being stationary. In some implementations the NO_MOTION_TRIG_CNT may be determined based on empirical testing.

The NO_MOTION_TRIG_CNT may be adjusted based at least in part on sensor data 160. For example, audio data may be acquired using the microphone. The audio data may be processed to determine a value indicative of loudness of the sound represented by the audio data. The value of the NO_MOTION_TRIG_CNT may be determined based on the value indicative of loudness. For example, a second lookup table may be used to associate loudness values with particular trigger count thresholds. In another example, a calculation may use the loudness value as input and produce as output the trigger count threshold. The value of the NO_MOTION_TRIG_CNT may be proportionate to the loudness. For example, as the microphone detects a decrease in noise, the trigger count threshold may decrease, and vice versa.

The values used for the IN_MOTION_TRIG_CNT and the NO_MOTION_TRIG_CNT may differ from one another. In some implementations the IN_MOTION_TRIG_CNT may be greater than the NO_MOTION_TRIG_CNT. For example, the IN_

MOTION_TRIG_CNT may have a value of 3 while the NO_MOTION_TRIG_CNT may have a value of 1. This difference in the trigger counts produces a hysteresis band for in motion detection and prevents high frequency transitions of the disposition data 174 determined by the motion detector module 240.

Figure 6:
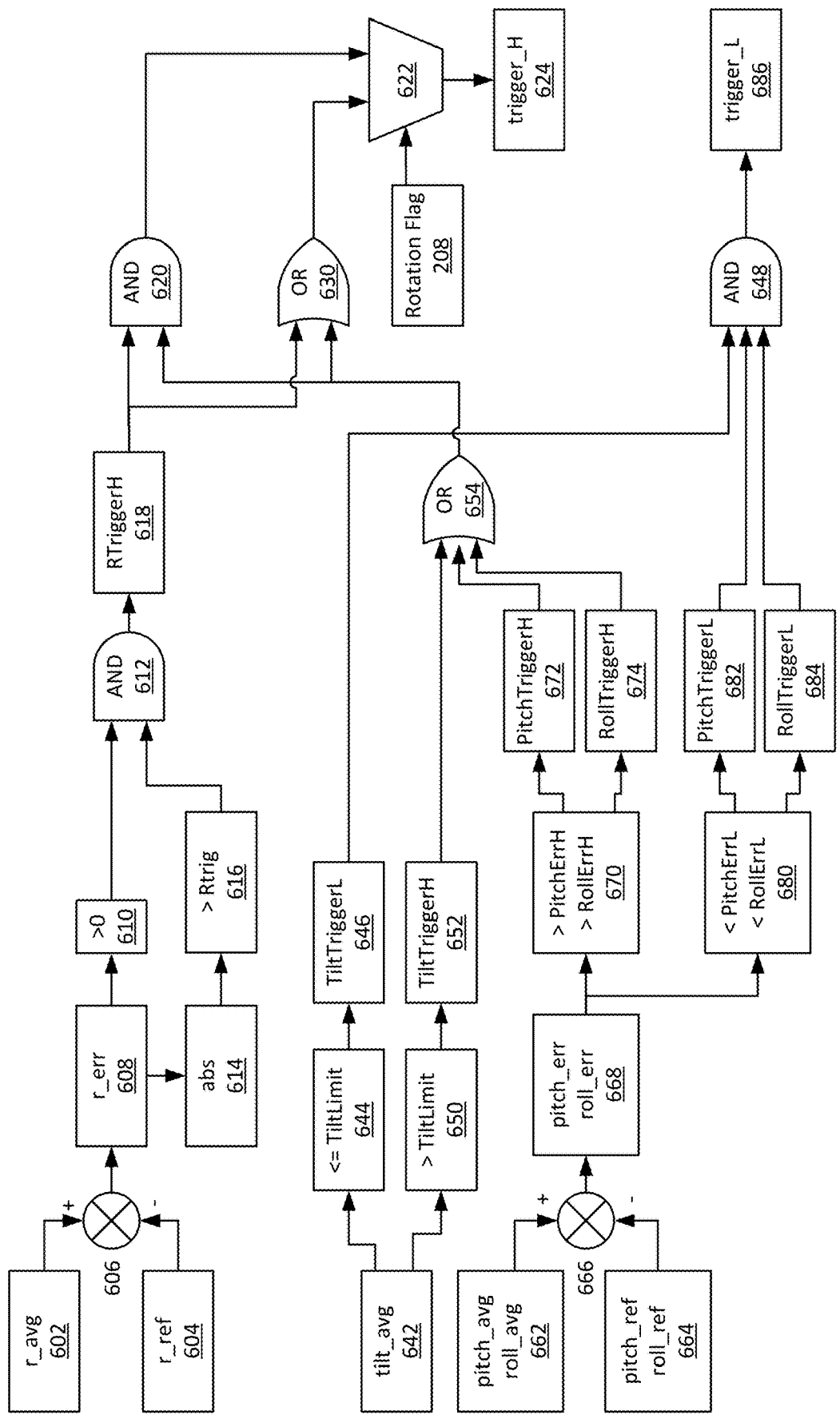
FIG. 6 is a flow diagram illustrating processing of data to determine occurrence of high triggers and low triggers that are used to determine disposition, according to some implementations.

FIG. 6 is a flow diagram 600 illustrating processing of data to determine high triggers and low triggers that are used by the motion detector module 240 to determine disposition data 174, according to some implementations.

At 602 "r_avg" is determined, comprising an average of the r values in the compensated data 224. For example, a mean of the r values is calculated. As mentioned above, r is indicative of an acceleration magnitude.

At 604 an acceleration magnitude reference "r_ref" is determined, comprising the value of r associated with the reference pose data 232. For example, the acceleration magnitude reference may be predetermined, determined based on quiet zone statistics 332, and so forth. For example, the acceleration magnitude reference may be a specified value such as 9.8 meters per second squared that is associated with gravitational acceleration. The specified value is associated with the device being stationary in Earth's gravitational field, with the device not accelerating relative to Earth's gravitational field, and so forth. In another example, the acceleration magnitude reference may comprise a moving average of the acceleration magnitude values stored in the quiet zone buffer 302.

At 606 a function determines a reference error "r_err" 608 based on r_avg and r_ref. For example, r_err 608 may be calculated as the difference r_avg−r_ref.

At 610 data is determined based on a comparison of the difference r_err from 608 with 0. If the difference from 608 is greater than 0, the value of 610 is true. If the difference from 608 is less than or equal to 0, the value of 610 is false. The data 610 is provided to a first input of block 612 that implements a logical AND function. The comparison of r_err with 0 facilitates determination of a disposition, such as the device 100 being picked up, that may result in an acceleration magnitude along a single axis. The comparison also prevents false triggers from other external stimuli, such as vibrations from sound in the surrounding environment, vibrations in the surface upon which the device 100 rests, and so forth.

At 614, an absolute value of r_err is determined. At 616 data is determined based on a comparison of the absolute value of r_err and a reference trigger value "Rtrig". If the absolute value of r_err is greater than a reference trigger value "Rtrig", the value of 616 is true. If the absolute value of r_err is less than or equal to the reference trigger value "Rtrig", the value of 616 is false. The value of 616 is provided to a second input of the block 612. The reference trigger value may be predetermined.

Block 612 implements a logical AND operation and provides RTriggerH 618 comprising data indicative of that operation. If the logical AND results in a true value, the value of RTriggerH 618 is true. If the logical AND results in a false value, the value of RTriggerH 618 is false. The RtriggerH 618 data is provided to a first input of block 620.

At 642 "tilt_avg" is determined, comprising an average of tilt values in the compensated data 224.

At 644 a comparison is made to determine TiltTriggerL 646. If at 644 the tilt_avg is less than or equal to a tilt limit "TiltLimit", then TiltTriggerL 646 is true. If at 644 the tilt_avg is greater than TiltLimit, then TiltTriggerL 646 is false. The tilt limit may be indicative of the maximum tilt that is deemed permissible before operation of the device 100 is affected. For example, the tilt limit may be based on a tilt at which the device 100 topples. The TiltTriggerL 646 is provided to an input of block 648.

At 650 a comparison is made to determine TiltTriggerH 652. If at 650 the tilt_avg is greater than TiltLimit, then TiltTriggerH 652 is true. If at 650 the tilt_avg is less than or equal to the TiltLimit, then TiltTriggerH 652 is false. The TiltTriggerH 652 is provided to an input of block 654. The TiltLimit may specify a maximum permitted tilt of the device.

At 662 pitch_avg and roll_average values are determined. The "pitch_avg" comprises an average pitch, such as an average value of the pitch values in the compensated data 224. The average roll "roll_avg" comprises an average value of the roll values in the compensated data 224.

At 664 pitch_ref and roll_ref values are determined. The pitch_ref comprises a reference pitch value as indicated in the reference pose data 232. The roll_ref comprises a reference roll value as indicated in the reference pose data 232.

At 666 pitch_err and roll_err values as indicated in data 668 are determined. The pitch_err is indicative of a difference between pitch_avg and pitch_ref. The roll_err is indicative of a difference between roll_avg and roll_ref.

At 670 a comparison of the pitch_err to the PitchErrH and a comparison of the roll_err to the RollErrH is performed to determine PitchTriggerH 672 and RollTriggerH 674. The PitchErrH is indicative of a high pitch error threshold value. The RollErrH is indicative of a high roll error threshold value. These values may be determined experimentally.

If the pitch_err is greater than the PitchErrH, the value of PitchTriggerH 672 will be true. If the pitch_err is less than or equal to the PitchErrH, the value of PitchTriggerH 672 will be false. The value of PitchTriggerH 672 is provided to a second input of the block 654.

If the roll_err is greater than the RollErrH, the value of RollTriggerH 674 will be true. If the roll_err is less than or equal to the RollErrH, the value of RollTriggerH 674 will be false. The value of RollTriggerH 674 is provided to a third input of the block 654.

At 680 a comparison of the pitch_err to the PitchErrL and a comparison of the roll_err to the RollErrL is performed to determine PitchTriggerL 682 and RollTriggerL 684. The PitchErrL is indicative of a low pitch error threshold value. The RollErrL is indicative of a low roll error threshold value. These values may be determined experimentally.

If the pitch_err is less than or equal to the PitchErrL, the value of PitchTriggerL 682 will be true. If the pitch_err is greater than the PitchErrL, the value of PitchTriggerL 682 will be false. The value of PitchTriggerL 682 is provided to a second input of the block 648.

If the roll_err is less than or equal to the RollErrL, the value of RollTriggerL 684 will be true. If the roll_err is greater than the RollErrL, the value of RollTriggerL 684 will be false. The value of RollTriggerL 684 is provided to a third input of the block 648.

Block 654 implements a logical OR function. If any of the inputs to block 654 are true, the output of block 654 will be true. Output of block 654 is provided to a second input of block 620.

Block 620 implements a logical AND function. When both the first input and the second input to block 620 are true, the output of block 620 will be true. Output of block 620 is provided to a first input to block 622.

Block 630 implements a logical OR function. If either of the first input or the second input are true, the output of block 630 will be true. Output of block 630 is provided to a second input of the block 622.

Block 622, selects input from either block 620 or block 630 based on the rotation flag 208 and provides as output trigger_H data that is indicative of occurrence of a high trigger. For example, if the rotation flag 208 is true indicating that the display device 112 is being moved by an actuator 142, input from block 620 is provided as the output of block 622. Continuing the example, if the rotation flag 208 is false indicating no motion of the display device 112, the input from block 630 may be provided as output of block 622. Operation of this block reduces false triggers resulting from motion produced by the actuator 142, while also allowing the system to still determine a change in disposition while the actuator 142 is operating.

Block 648 implements a logical AND function. When all of the first input, the second input, and the third input to block 648 are true, the output of block 648 will be true. Responsive to the true output from block 648, trigger_L data 686 is generated that is indicative of occurrence of a low trigger.

As described above, the motion detector module 240 may implement the FSM described with regard to FIG. 5 to use the trigger_H 624 and trigger_L 686 to determine a state of the device 100. Once the state is determined, the disposition data 174 may be determined that is indicative of the state. For example, while in the NO_MOTION 504 state, the disposition data 174 is indicative of "no motion". While in the IN_MOTION 508 state, the disposition data 174 is indicative of "in motion".

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. In particular, copyright to the computer program listing submitted herewith is asserted.

The techniques described herein may be used by other devices and in other situations. For example, an augmented reality device, virtual reality device, mobile phone, tablet, robot, autonomous vehicle, and so forth may use the techniques described in this disclosure.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   one or more actuators;
   a multi-axis accelerometer comprising:
      a first linear accelerometer oriented along a first axis;
      a second linear accelerometer oriented along a second axis; and
      a third linear accelerometer oriented along a third axis, wherein each of the first, the second, and the third axes are orthogonal to each other;
   one or more memories storing first computer-executable instructions; and
   one or more processors to execute the first computer-executable instructions to:
      acquire, using the multi-axis accelerometer, first data during a first time interval, wherein the first data is indicative of first acceleration along the first axis, second acceleration along the second axis, and third acceleration along the third axis;
      determine second data based on the first data, wherein the second data is indicative of tilt, roll, pitch, and acceleration magnitude of the device;
      determine, based on the second data, third data indicative of an orientation of the multi-axis accelerometer;
      acquire, using the multi-axis accelerometer, fourth data during a second time interval;
      determine, based on the third data and the fourth data, fifth data indicative of a physical disposition of the device; and stop movement of the one or more actuators based on the fifth data.

2. The device of claim 1, the first computer-executable instructions to determine the third data comprising instructions to:
   determine a first plurality of values for the tilt during the first time interval;
   determine a first standard deviation of the first plurality of values;
   determine the first standard deviation is less than a first threshold value, wherein the first threshold value is indicative of a maximum permitted tilt of the device;
   determine a second plurality of values for the roll during the first time interval;
   determine a second standard deviation of the second plurality of values;
   determine the second standard deviation is less than a second threshold value, wherein the second threshold value is indicative of a maximum permitted roll of the device;
   determine a third plurality of values for the pitch during the first time interval;
   determine a third standard deviation of the third plurality of values;
   determine the third standard deviation is less than a third threshold value, wherein the third threshold value is indicative of a maximum permitted pitch of the device;
   determine a fourth plurality of absolute values for the acceleration magnitude during the first time interval;
   determine a moving average of the fourth plurality of absolute values; and
   determine that the moving average is less than a fourth threshold value, wherein the fourth threshold value is indicative of the device being stationary.

3. The device of claim 1, the first computer-executable instructions to determine the third data comprising instructions to:
   determine a first plurality of values for the tilt during the first time interval;
   determine a first mean of the first plurality of values;
   determine the first mean is less than a first threshold value, wherein the first threshold value is indicative of a maximum permitted tilt of the device;
   determine a second plurality of values for the roll during the first time interval;
   determine a second mean of the second plurality of values;
   determine the second mean is less than a second threshold value, wherein the second threshold value is indicative of a maximum permitted roll of the device;
   determine a third plurality of values for the pitch during the first time interval;
   determine a third mean of the third plurality of values;
   determine the third mean is less than a third threshold value, wherein the third threshold value is indicative of a maximum permitted pitch of the device;
   determine a fourth plurality of absolute values for the acceleration magnitude during the first time interval;
   determine a fourth mean of the fourth plurality of absolute values of the acceleration magnitude;
   determine the fourth mean is less than a fourth threshold value, wherein the fourth threshold value is indicative of the device being stationary; and
   wherein the third data comprises the first mean, the second mean, the third mean, and the fourth mean.

4. The device of claim 1, wherein the first computer-executable instructions comprise instructions to:
   determine sixth data indicative of operation of the one or more actuators during at least a portion of the first time interval; and
   wherein the instructions to determine the third data are responsive to the sixth data indicating that the one or more actuators are in operation.

5. The device of claim 1, wherein the first computer-executable instructions further comprise instructions to:
   determine a first plurality of acceleration magnitude values during the first time interval;
   determine an average of the first plurality of acceleration magnitude values;
   determine sixth data indicative of a reference value of an acceleration magnitude associated with the device being stationary in a gravitational field;
   determine a reference error based on a difference between the average of the first plurality and the sixth data;
   determine the reference error has a value greater than zero;
   determine an absolute value of the reference error is greater than a first threshold value;
   generate a first trigger value;
   determine a count of generated first trigger values;
   determine the count exceeds a second threshold value that is associated with the device being in motion; and
   wherein, responsive to the count exceeding the second threshold value, the fifth data is indicative of the device being in motion.

6. The device of claim 1, wherein the first computer-executable instructions further comprise instructions to:
   determine a first plurality of acceleration magnitude values during the first time interval;
   determine an average of the first plurality of acceleration magnitude values;
   determine an acceleration magnitude reference;
   determine a reference error based on a difference between the average of the first plurality and the acceleration magnitude reference;
   determine sixth data indicative of:
      the reference error having a value greater than zero; and
      an absolute value of the reference error being greater than a first threshold value;
   determine seventh data indicative of one or more of the tilt, roll, or pitch being greater than a second threshold value;
   determine, based on the sixth data and the seventh data, a first trigger value; and
   wherein the fifth data is based on the first trigger value and is indicative of the device being in motion.

7. The device of claim 1, wherein the first computer-executable instructions further comprise instructions to:
   determine a first plurality of values for the tilt during the first time interval;
   determine an average tilt based on the first plurality;
   determine a second plurality of values for the pitch during the first time interval;
   determine an average pitch based on the second plurality;
   determine a third plurality of values for the roll during the first time interval;

determine an average roll based on the third plurality;
generate a first trigger value responsive to each occurrence of one or more of:
the average tilt being less than a first threshold value,
the average pitch being less than a second threshold value, or
the average roll being less than a third threshold value;
determine a count of one or more of the first trigger values as generated; and
determine the count exceeds a fourth threshold value that is associated with the device not being in motion.

8. The device of claim 1, further comprising:
a microphone; and
wherein the first computer-executable instructions further comprise instructions to:
determine first audio data using the microphone;
determine, during the first time interval, sixth data indicative of loudness of sound represented by the first audio data;
determine one or more threshold values based on the sixth data;
compare at least a portion of the second data with the one or more threshold values; and
wherein the fifth data is determined based at least in part on the comparison.

9. A method comprising:
acquiring, during a first time interval, first data that is indicative of motion of a device with respect to a plurality of axes, wherein each of the plurality of axes are orthogonal to each other;
determining second data based on the first data, wherein the second data is indicative of a plurality of one or more of: tilt, roll, pitch, or acceleration magnitude;
determining, based on the second data, third data indicative of an orientation of the device;
acquiring, during a second time interval, fourth data that is indicative of the motion of the device;
determining, based on the third data and the fourth data, fifth data indicative of a physical disposition of the device; and
stopping movement of an actuator of the device based on the fifth data.

10. The method of claim 9, the determining the third data comprising:
determining a first plurality of values for the tilt during the first time interval;
determining a first statistic of the first plurality of values;
determining the first statistic is less than a first threshold value, wherein the first threshold value is indicative of a maximum permitted tilt of the device;
determining a second plurality of values for the roll during the first time interval;
determining a second statistic of the second plurality of values;
determining the second statistic is less than a second threshold value, wherein the second threshold value is indicative of a maximum permitted roll of the device;
determining a third plurality of values for the pitch during the first time interval;
determining a third statistic of the third plurality of values;
determining the third statistic is less than a third threshold value, wherein the third threshold value is indicative of a maximum permitted pitch of the device;
determining a fourth plurality of values for the acceleration magnitude during the first time interval;
determining a fourth statistic of the fourth plurality of values; and
determining the fourth statistic is greater than a fourth threshold value, wherein the fourth threshold value is indicative of the device being in motion.

11. The method of claim 9, the determining the third data comprising:
determining sixth data indicative of one or more of:
operation of the actuator of the device, or
instructions to operate the actuator of the device during at least a portion of the first time interval; and
wherein the determining the third data is responsive to the sixth data.

12. The method of claim 9, further comprising:
determining a first plurality of values for the tilt during the first time interval;
determining an average tilt based on the first plurality;
determining a second plurality of values for the pitch during the first time interval;
determining an average pitch based on the second plurality;
determining a third plurality of values for the roll during the first time interval;
determining an average roll based on the third plurality;
generating a first trigger when:
the average tilt is less than a first threshold value,
the average pitch is less than a second threshold value, or
the average roll is less than a third threshold value;
determining the first trigger exceeds a fourth threshold value; and
wherein the fifth data is indicative of the device being in motion.

13. The method of claim 9, further comprising:
determining a first plurality of values for the tilt during the first time interval;
determining a first mean of the first plurality of values;
determining the first mean is less than a first threshold value, wherein the first threshold value is indicative of a maximum permitted tilt of the device;
determining a second plurality of values for the roll during the first time interval;
determining a second mean of the second plurality of values;
determining the second mean is less than a second threshold value, wherein the second threshold value is indicative of a maximum permitted roll of the device;
determining a third plurality of values for the pitch during the first time interval;
determining a third mean of the third plurality of values;
determining the third mean is less than a third threshold value, wherein the third threshold value is indicative of a maximum permitted pitch of the device;
determining a fourth plurality of absolute values for the acceleration magnitude during the first time interval;
determining a fourth mean of the fourth plurality of absolute values of the acceleration magnitude;
determining the fourth mean is less than a fourth threshold value, wherein the fourth threshold value is indicative of the device being stationary; and
wherein the third data comprises the first mean, the second mean, the third mean, and the fourth mean.

14. A device comprising:
one or more actuators;
a multi-axis motion sensor;
one or more memories storing first computer-executable instructions; and one or more processors to execute the first computer-executable instructions to:
acquire, using the multi-axis motion sensor, first data during a first time interval, wherein the first data is indicative of motion relative to a plurality of axes;
determine second data based on the first data, wherein the second data is indicative of a plurality of one or more of: tilt, roll, pitch, or magnitude of motion;
determine, based on the second data, third data indicative of an orientation of the device;
acquire, using the multi-axis motion sensor, fourth data during a second time interval;
determine, based on the third data and the fourth data, fifth data indicative of a physical disposition of the device; and
stop movement of the one or more actuators based on the fifth data.

15. The device of claim 14, the first computer-executable instructions to determine the third data comprising instructions to:
determine a first plurality of values for the tilt during the first time interval;
determine a first standard deviation of the first plurality of values;
determine the first standard deviation is less than a first threshold value, wherein the first threshold value is indicative of a maximum permitted tilt of the device;
determine a second plurality of values for the roll during the first time interval;
determine a second standard deviation of the second plurality of values;
determine the second standard deviation is less than a second threshold value, wherein the second threshold value is indicative of a maximum permitted roll of the device;
determine a third plurality of values for the pitch during the first time interval;
determine a third standard deviation of the third plurality of values;
determine the third standard deviation is less than a third threshold value, wherein the third threshold value is indicative of a maximum permitted pitch of the device;
determine a fourth plurality of absolute values for the magnitude of motion during the first time interval;
determine a moving average of the fourth plurality of absolute values; and
determine the moving average is less than a fourth threshold value, wherein the fourth threshold value is indicative of the device being stationary.

16. The device of claim 14, the first computer-executable instructions to determine the third data comprising instructions to:
determine a first plurality of values for the tilt during the first time interval;
determine a first mean of the first plurality of values;
determine the first mean is less than a first threshold value, wherein the first threshold value is indicative of a maximum permitted tilt of the device;
determine a second plurality of values for the roll during the first time interval;
determine a second mean of the second plurality of values;
determine the second mean is less than a second threshold value, wherein the second threshold value is indicative of a maximum permitted roll of the device;
determine a third plurality of values for the pitch during the first time interval;
determine a third mean of the third plurality of values;
determine the third mean is less than a third threshold value, wherein the third threshold value is indicative of a maximum permitted pitch of the device;
determine a fourth plurality of absolute values for the magnitude of motion during the first time interval;
determine a fourth mean of the fourth plurality of absolute values;
determine the fourth mean is less than a fourth threshold value, wherein the fourth threshold value is indicative of the device being stationary; and
wherein the third data comprises the first mean, the second mean, the third mean, and the fourth mean.

17. The device of claim 14, wherein the first computer-executable instructions comprise instructions to:
determine sixth data indicative of operation of the one or more actuators during at least a portion of the first time interval; and
wherein the instructions to determine the third data are responsive to the sixth data indicating the one or more actuators are in operation.

18. The device of claim 14, wherein the first computer-executable instructions further comprise instructions to:
determine a first plurality of magnitude of motion values during the first time interval;
determine an average of the first plurality;
determine a magnitude of motion reference;
determine a reference error based on a difference between the average of the first plurality and the magnitude of motion reference;
determine sixth data indicative of:
the reference error having a value greater than zero; and
an absolute value of the reference error being greater than a first threshold value;
determine seventh data indicative of one or more of the tilt, roll, or pitch being greater than a second threshold value;
determine, based on the sixth data and the seventh data, a first trigger value; and
wherein the fifth data is based on the first trigger value and is indicative of the device being in motion.

19. The device of claim 14, wherein the first computer-executable instructions further comprise instructions to:
determine a first plurality of values for the tilt during the first time interval;
determine an average tilt based on the first plurality;
determine a second plurality of values for the pitch during the first time interval;
determine an average pitch based on the second plurality;
determine a third plurality of values for the roll during the first time interval;
determine an average roll based on the third plurality;
generate a first trigger when:
the average tilt is less than a first threshold value,
the average pitch is less than a second threshold value, or
the average roll is less than a third threshold value;
determine the first trigger exceeds a fourth threshold value; and
wherein the fifth data is indicative of the device being in motion.

20. The device of claim 14, further comprising:
a microphone; and
wherein the first computer-executable instructions further comprise instructions to:
  determine first audio data using the microphone;
  determine, during the first time interval, sixth data indicative of loudness of sound represented by the first audio data;
  determine one or more threshold values based on the sixth data;
  compare at least a portion of the second data with the one or more threshold values; and
  wherein the fifth data is determined based at least in part on the comparison.

* * * * *